(12) United States Patent
Cai

(10) Patent No.: US 7,856,879 B2
(45) Date of Patent: Dec. 28, 2010

(54) HEATER CONTROLLER HAVING IMPROVED START-UP FOR THERMAL SENSOR

(75) Inventor: Yongyao Cai, Acton, MA (US)

(73) Assignee: MEMSIC, Inc., Andover, MA (US)

( * ) Notice: Subject to any disclaimer, the term of this patent is extended or adjusted under 35 U.S.C. 154(b) by 514 days.

(21) Appl. No.: 12/001,299

(22) Filed: Dec. 11, 2007

(65) Prior Publication Data

US 2009/0145226 A1   Jun. 11, 2009

(51) Int. Cl.
G01P 15/00 (2006.01)
G01P 15/08 (2006.01)
(52) U.S. Cl. .................. 73/514.09; 73/514.05
(58) Field of Classification Search .............. 73/514.05, 73/514.06, 514.07, 514.09, 514.12, 497, 73/514.33
See application file for complete search history.

(56) References Cited

U.S. PATENT DOCUMENTS

| 6,182,509 | B1 | 2/2001 | Leung |
| 6,589,433 | B2 | 7/2003 | Leung |
| 6,795,752 | B1 | 9/2004 | Zhao et al. |
| 7,069,785 | B2 | 7/2006 | Chou |
| 7,305,881 | B2 * | 12/2007 | Zhao et al. ............... 73/514.05 |
| 7,426,862 | B2 * | 9/2008 | Dido et al. ............... 73/514.09 |
| 7,461,535 | B2 * | 12/2008 | Huang et al. .................. 73/1.01 |

* cited by examiner

Primary Examiner—Helen C. Kwok
(74) Attorney, Agent, or Firm—Weingarten, Schurgin, Gagnebin & Lebovici LLP

(57) ABSTRACT

A closed-loop heater control circuit for use with integrated circuit thermal sensing devices, such as thermal accelerometers, is disclosed. The heater control circuit includes a switched-capacitor integrating circuit and a controller or modulator. The switched-capacitor integrating unit integrates a common-mode voltage signal from an instrument amplifier with respect to an analog common reference voltage. In operation, the switched-capacitor integrating unit is adapted so that the closed-loop is opened briefly at the beginning of every new cycle, e.g., using an enable signal, during fast start-up or power-down.

19 Claims, 4 Drawing Sheets

HEATER CONTROLLER HAVING IMPROVED START-UP FOR THERMAL SENSOR

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to sensing devices, and more specifically to improved heater controllers for silicon, micro-machined thermal sensing devices and to thermal sensing devices having the improved heater controllers.

Silicon, micro-machined thermal sensing devices that employ the principle of free convection heat transfer of a hot air bubble in an enclosed chamber are well-known to the art. Referring to FIG. 1, such devices 10, typically, include a chamber 12 that has been micro-machined or etched into a silicon substrate 40. A heater resistor 15 is structured and arranged across the chamber 12 and electrically coupled to a power supply 14 via a controller or modulator 70. X-axis 22 and 28 and y-axis thermocouple pairs 24 and 26 are disposed on opposing sides of the heater resistor 15, to measure temperature changes in two axes.

In U.S. Pat. No. 6,795,752, which is co-owned by MEMSIC, Inc. of Andover, Mass., the assignee of the present invention, a control circuit is disclosed for an integrated convective accelerometer device. During conditions of zero acceleration, the temperature profile about the heater resistor 15 is symmetrical such that the thermocouple pairs in the x-axis 22, 28 and in the y-axis 24, 26 sense the same temperature and, therefore, provide the same output voltage. Acceleration applied along the thermocouple-heater-thermocouple axis causes disturbance of the temperature profile due to free convection heat transfer, thereby causing an asymmetrical temperature profile.

The asymmetrical temperature profile is sensed by the thermocouple pairs, to provide output voltages that differ and a differential output voltage that is proportional to the applied acceleration. The differential output voltage typically requires signal conditioning to interface with the electronics of a particular application. Such signal conditioning is implemented using external electronic components and/or circuitry combined on the same substrate as the convective accelerometer.

FIG. 2 shows an illustrative control circuit for regulating heater power in accordance with the prior art. As shown in FIG. 2, a cavity 12 is micro-machined or etched into a silicon substrate 40. A heater resistor 15 is structured and arranged across the cavity 12, e.g., using a suspended bridge. Thermocouples 20 and 30 are structured and arranged on opposite sides of the heater resistor 15.

Voltages at the respective positive terminals, $V_{2+}$ and $V_{2-}$, of the thermocouples 20 and 30 are applied as input to a chopping, stabilized instrument amplifying circuit ("instrument amplifier" or "chopper") 60. Voltages at the respective negative terminals, $V_1$, of the thermocouples 20 and 30 are commonly applied to a heater power adjusting circuit 90, e.g., a voltage divider. In the closed-loop control system, heater power is set by the resistive tapping point of the heater power adjusting circuit 90.

In the instrument amplifier 60, each of the positive terminal voltages, $V_{2+}$ and $V_{2-}$, is input into the positive terminal of respective operational amplifiers ("opamps") 62 and 64. The common-mode voltage, $V_{com}$, of the thermocouple outputs is equal to the average of the positive terminal voltages, $V_{2+}$ and $V_{2-}$ and, furthermore, is proportional to heater power. Hence, common-mode voltage, $V_{com}$, of the instrument amplifier 60 can be used to provide a measure of heater power to a heater closed loop control circuit 100.

For example, as shown in FIG. 2, the common-mode voltage, $V_{com}$, can be input into the negative terminal of an integrating operational amplifier circuit ("integrator") 85 while the positive terminal is electrically coupled to a constant voltage source, $V_{bs}$. So configured, the integrator 85 serves as an error amplifier to drive the common-mode voltage, $V_{com}$, to a fixed voltage, i.e., $V_{bs}$, which, in FIG. 2, is 1 Volt (V).

Problematically, start-up time associated with the control loop associated with U.S. Pat. No. 6,795,752 is relatively slow. Indeed, as shown in FIG. 3, the thermal sensing circuit includes a heating circuit 21, a flowing fluid 23, a thermal couple circuit 25, and a heater control circuit 27, which are spatially-disposed relatively close to one another. As a result of this spatial proximity, in order to make the feedback system stable, the frequency pole of the heater control circuit 27 must be the dominant pole. However, because the frequency pole of the heater control circuit 27 has a very low frequency, system response time is relatively slow. In short, the dilemma facing designers requires a compromise between system stability and a faster start-up time.

It would therefore be desirable to have an improved silicon, micro-machined thermal sensing device that provides a faster start-up time while maintaining system stability within acceptable limits.

BRIEF SUMMARY OF THE INVENTION

A closed-loop heater control circuit for use with integrated circuit thermal sensing devices, such as thermal accelerometers, is disclosed. The heater control circuit includes a switched-capacitor integrating circuit and a controller or modulator. The switched-capacitor integrating unit integrates a common-mode voltage signal from an instrument amplifier with respect to an analog common reference voltage. In operation, the switched-capacitor integrating unit is adapted so that the closed-loop is opened briefly at the beginning of every new cycle, e.g., using an enable signal, during fast start-up or power-down.

BRIEF DESCRIPTION OF THE SEVERAL VIEWS OF THE DRAWING

The invention will be more fully understood with reference to the following Detailed Description of the Invention in conjunction with the Drawings of which.

DETAILED DESCRIPTION OF THE INVENTION

The invention discloses novel thermal convection accelerometers with closed-loop controls as well as an improvement to the thermal convection accelerometers that are described in U.S. Pat. No. 6,795,752, which is incorporated herein in its entirety by reference. Although the invention will be described in relation to an application for a thermal accelerometer, the invention is not to be construed as being limited thereto. Those of ordinary skill in the art can appreciate the myriad of applications of the invention to other integrated circuits, sensing devices, and thermal sensing devices.

Figure 1:
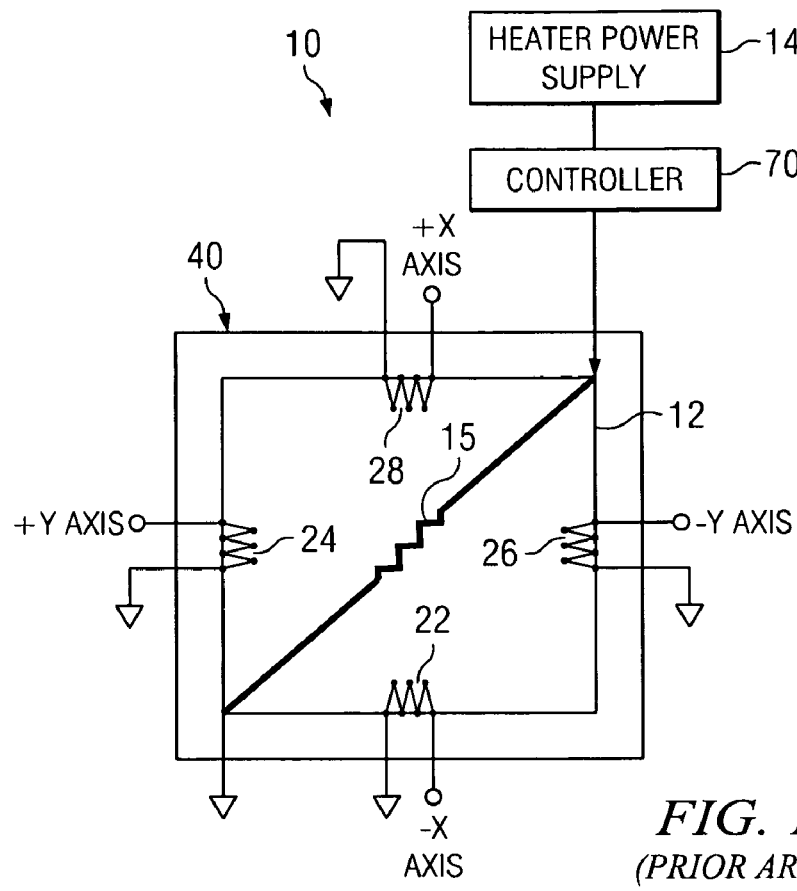
FIG. 1 is a schematic drawing of a thermal sensing device in accordance with the prior art.
Figure 3:
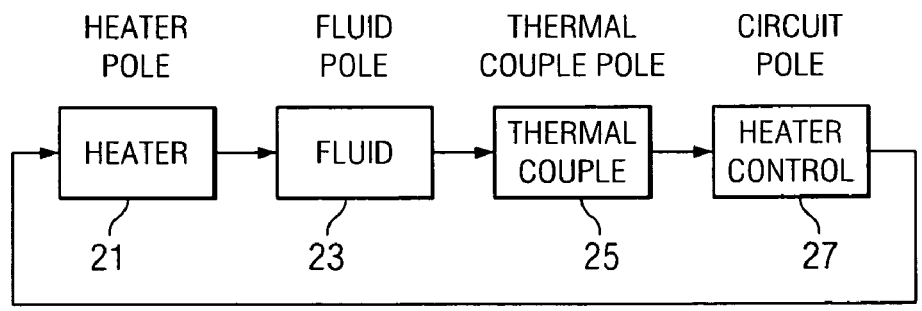
FIG. 3 is a block diagram of a thermal sensing device in accordance with the prior art.
Figure 2:
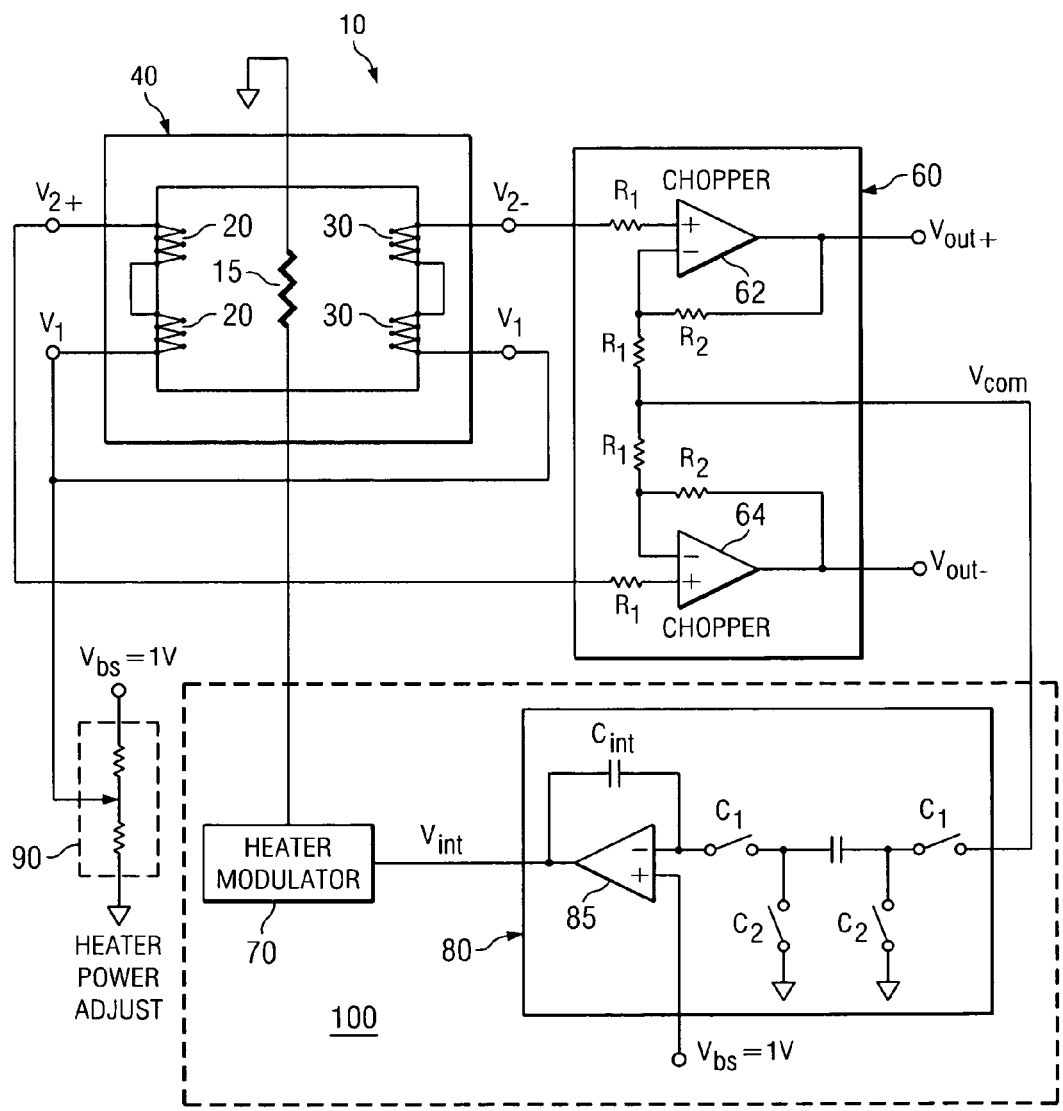
FIG. 2 is a schematic drawing of a heater control circuit for a thermal sensing device in accordance with the prior art.
Figure 4:
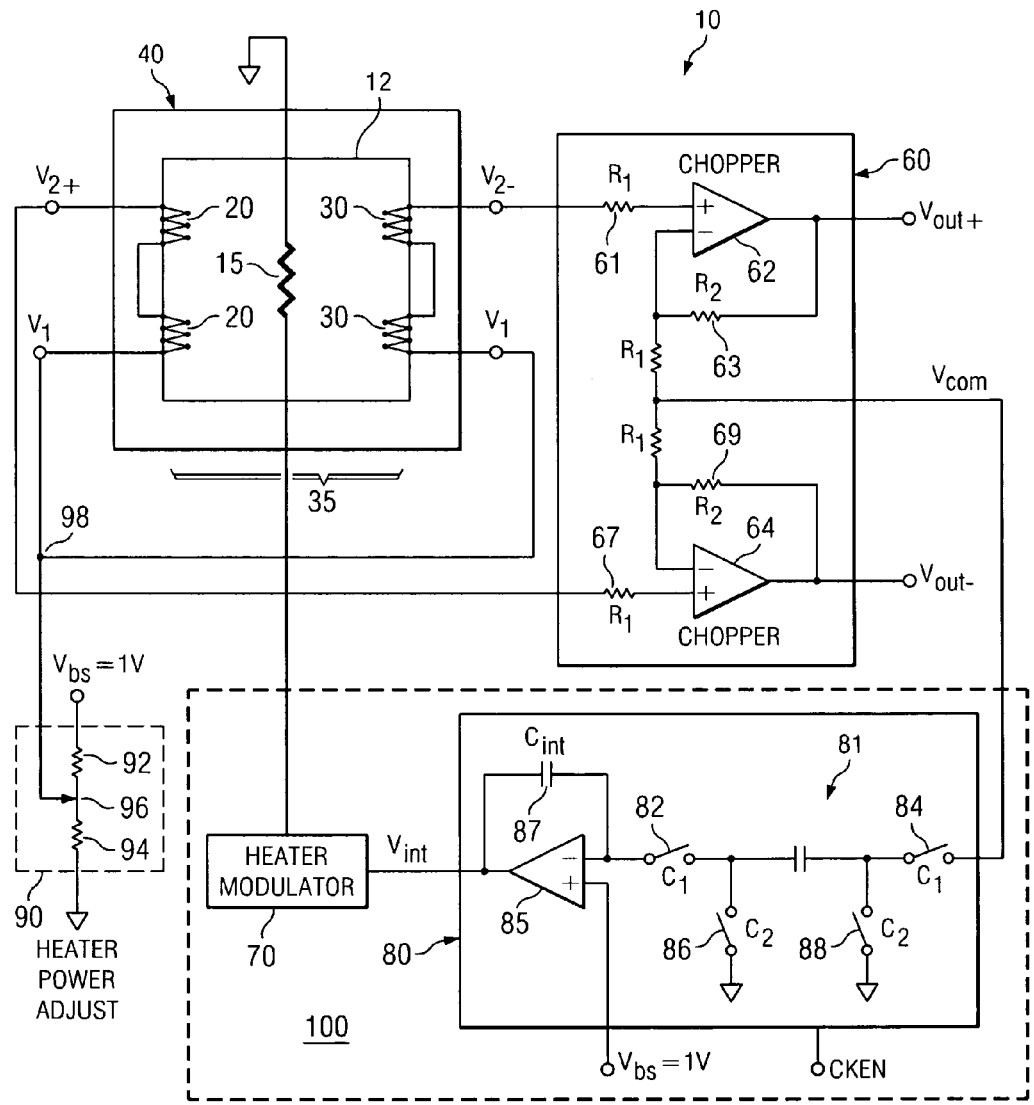
FIG. 4 is a schematic drawing of an illustrative closed-loop heater control circuit for a thermal sensing device in accordance with the present invention.

FIG. 4 shows a diagram of an illustrative thermal sensing device 10 that includes a thermopile/heater 35, a heater power adjusting circuit 90, a stabilized instrumentation amplifier 60, and a closed-loop heater control circuit 100. The thermopile/heater 35 includes a heater element 15, which in a preferred embodiment is a heater resistor, and an array of thermocouples 20 and 30, each of which is disposed on opposing sides of the heater element 15. The thermocouples 20 and 30 are electrically coupled at one end and provide output voltages, $V_{2+}$ and $V_{2-}$, at respective opposite ends.

The thermocouples 20 and 30 and the heater element 15 can be formed using conventional CMOS processing. For example, the thermocouples 20 and 30 can be formed by aluminum and polysilicon layers disposed on a silicon substrate 40 and the heater element 15 can be formed by the polysilicon layer disposed on the same substrate 40. A chamber is formed by micro-machining or etching the surface of the substrate 40 to create a cavity 12. The heater element 15 is suspended across the cavity 12 with the thermocouples 20 and 30 disposed on opposing sides of the heater element 15. Accordingly, a thermal-sensitive axis passes perpendicularly through the axes of the heater element 15 and of the thermocouples 20 and 30.

The differential output voltage of the thermocouples 20 and 30, i.e., $(V_{2+}-V_{2-})$, is proportional to the magnitude of acceleration applied along this perpendicular axis. Furthermore, the average of the common-mode output voltage, $V_{com}$, of the thermopile/heater 35 is proportional to the power dissipated in the heater element 15.

At relatively low power levels, the sensitivity of the thermal sensing device 10 included in the system generally varies according to the square of the heater element power. At relatively high power levels, however, sensitivity generally varies directly with the heater power. Thus, it is desirable that the sensitivity of the thermal sensing device 10 be maintained at a desired value over power supply voltage variations. Closed-loop heater control of the common-mode voltage drop across the thermocouples 20 and 30 can be used further to ensure sensitivity within tolerable limits.

The common-mode voltage, $V_{com}$, drop across the thermocouples 20 and 30 can be controlled and set at a desired level using the heater power adjusting circuit 90. For example, the heater power adjusting circuit 90 can include a calibration adjustment device 92, e.g., a resistor, that is coupled at one end to an analog, common reference voltage, $V_{bs}$, and coupled at an opposing end in series to a resistor 94, which, in turn, is coupled to ground. The common node 96 of the calibration adjustment device 92 and the resistor 94 is connected to the coupled ends 98 of the thermocouples 20 and 30 of the thermopile/heater 35. Accordingly, the desired common-mode voltage drop across the thermocouples 20 and 30 can be established by providing a predetermined signal to the calibration adjustment device 92 of the heater power adjusting circuit 90, to set and fix the voltage level at the coupled ends 98 of the thermocouples 20 and 30.

The instrumentation amplifier 60 amplifies the differential output voltage provided by the thermopile/heater 35 and converts the differential output voltage to a single-ended output voltage referenced to the analog common reference point, $V_{bs}$. More particularly, the instrumentation amplifier 60 extracts the common-mode output voltage, $V_{com}$, from the thermopile output voltages, $V_{2+}$ and $V_{2-}$, and delivers the common-mode output voltage, $V_{com}$, to the integrating device, or error amplifier, 80 of the closed-loop heater control circuit 100. The common-mode output voltage, $V_{com}$, of the thermocouples 20 and 30 is used to regulate the average power provided to the heater element 15.

As shown in FIG. 4, the instrumentation amplifier 60 includes a differential input stage comprising a first operational amplifier ("opamp") 62, input resistor 61 ($R_1$), and feedback resistor 63 ($R_2$); and, a second opamp 64, input resistor 67 ($R_1$), and feedback resistor 69 ($R_2$). The opamps 62 and 64, respective resistors 61 and 67, and respective feedback resistors 63 and 69 are structured and arranged to form a pair of non-inverting gain stages, each having an exemplary gain of, for example, 100. Gain is defined by the following equation:

$$\text{Gain} = \frac{V_{out+/-}}{V_{2+/-}} = \frac{R_1 + R_2}{R_1}$$

In order to achieve the relatively large closed-loop gain of 100, the opamps 62 and 64 can be implemented as identical chopper amplifiers. Each chopper amplifier 62 or 64 can be structured and arranged to include a first stage comprising a common-source/common-gate amplifier configuration and second and third stages, each comprising a common-source amplifier configuration. The common-source/common-gate amplifier configuration of the first stage of the chopper amplifiers 62 and 64 improves voltage gain for achieving the relatively large closed-loop gain of 100.

The closed-loop heater control circuit 100 includes a switched-capacitor integrating circuit, or error amplifier, 80 and a controller or modulator 70. The difference between the common-mode output voltage, $V_{com}$, and the analog common reference voltage, $V_{bs}$, can be integrated by the switched-capacitor integrating circuit 80 that includes, for example, an integrating opamp 85, a switched input capacitor device 81, and an integrating (feedback) capacitor ($C_{int}$) 87. The switched input capacitor device 81 includes a plurality of switches 82, 84, 86, and 88, which can be implemented using CMOS transmission gates.

The switched-capacitor integrator stage amplifies and (low-pass) filters the common-mode output voltage, $V_{com}$, of the thermocouples 20 and 30 provided by the instrumentation amplifier 60. It also provides an amplified and filtered output voltage, $V_{int}$, to the controller or modulator 70 of the closed-loop heater control circuit 100. The switched-capacitor integrator stage can be implemented as a non-inverting stage having a relatively low unity gain frequency, e.g., 5 Hz, in order to optimize the phase margin.

Output from the switched-capacitor integrating circuit 80, $V_{int}$, is provided to the controller or modulator 70, e.g., a sigma-delta modulator. The controller or modulator 70 generates a pulse density signal that turns ON and OFF at least one switch transistor (not shown) using Pulse-Density Modulation (PDM) or Pulse-Width Modulation (PWM). The turning ON or OFF of the at least one switch transistor causes the heater element 15 to be either open or to have the entire power supply voltage across it.

The pulse density signal has an average value that is proportional to the output voltage of the integrator, $V_{int}$. Thus, the pulsed output voltage from the controller or modulator 70 controls the common-mode voltage, $V_{com}$ drop across the thermocouples 20 and 30.

Switching the switch transistor(s) ON or OFF using the pulse sequence generated by the controller or modulator 70 causes the power provided to the heater element 15 from the supply voltage, $V_{dd}$, through the switch transistor(s) to be pulsed. In the above-mentioned exemplary configurations the accelerometer sensor comprising the heater element 15 and the thermocouples 20 and 30 has a relatively low-frequency double pole, e.g., approximately 80 Hz. Accordingly, in the exemplary configuration, the acceleration thermal sensing device 10 attenuates the high frequency content of the pulsed power provided to the heater element 15, thereby averaging the heater power to provide a substantially constant voltage.

While the thermal accelerometer 10 is being power-cycled, the heater element 15, any flowing fluid (if not hermetically-sealed), and thermocouples 20 and 30 experience temperature cycling as well. For stability reasons, the heater control circuit loop time, i.e., the heater frequency pole, is significantly longer than the total time necessary for the thermal system to be heated up to a stable temperature. However, because the factors that may affect heater control circuit status involve, for the most part, slow-changing parameters, such as ambient temperature, age of the heater element 15, variations in power supply, and so forth, from cycle to cycle, during a fast power-cycling event, the heater control circuit loop experiences and, consequently, requires limited change.

In accordance with the invention, at the beginning of every cycle after start-up, it is possible to use stored information about the status of the heater control loop from the end of the preceding cycle. Consequently, at the beginning of every new cycle, until the thermal system reaches a stable temperature state, the heater control circuit loop can be "open" and historical status information of the heater control circuit loop from the previous cycle can be used. Subsequently, after the thermal system reaches a stable temperature state, the heater control circuit loop can be "closed" and normal operation in adjusting the heater element power can be resumed, e.g., to account for changes in ambient temperature, changes in heater resistance, changes in power supply, and so forth.

Consequently, by opening the heater control circuit loop during the initial phase of start-up, the dominant pole of the control circuit, which corresponds to the pole having the lowest frequency, does not affect the start-up turn-on time. Furthermore, even with an open heater control circuit loop, overall system stability is assured because the frequency pole heater control circuit loop ensures an acceptable phase margin even at a relatively low frequency.

Referring to FIG. 4, one means of opening the heater control circuit loop at the beginning of every new cycle is to include a clock enable signal CK_EN 89 with the error amplifier 80 of the heater control circuit 100. The enabling signal CK_EN 89 can be a logic LO signal immediately after the thermal sensing device is turned on. Those of ordinary skill in the art can appreciate that circuitry can be added to maintain a low enabling signal CK_EN 89 for as long as it takes for the thermal system to reach a stable temperature state in an open-loop condition.

More particularly, during a fast start-up or a power-down phase, switching devices 82 and 84 (designated $c_1$) are opened, i.e., OFF, and switching devices 86 and 88 (designated $c_2$) are closed, i.e., ON. As a result, the charge stored in the switched-capacitor 81 will remain the same and the voltage at the negative terminal of the opamp 85 will not change, nor will the output signal, $V_{int}$, to the controller or modulator 70

After a pre-determined amount of time during each new cycle, for example: the time it takes for the thermal system to reach a stable temperature state in an open-loop condition, the enabling signal CK_EN 89 will cause switching devices 82 and 84 to close, i.e., turn ON, and switching devices 86 and 88 to open, i.e., turn OFF. Once this occurs, the common-mode voltage, $V_{com}$, is sent to the negative terminal of the integrating opamp 85 where it compared to the analog common reference voltage, $V_{bs}$. Based on the comparison, the integrating opamp 85 outputs signal, $V_{int}$, to control the function of the heater element 15. More specifically, based on the output signal, $V_{int}$, the heater controller or modulator 70, e.g., a sigma-delta modulator, modulates the current flowing through the heater element 15, to adjust the temperature.

Figure 5:
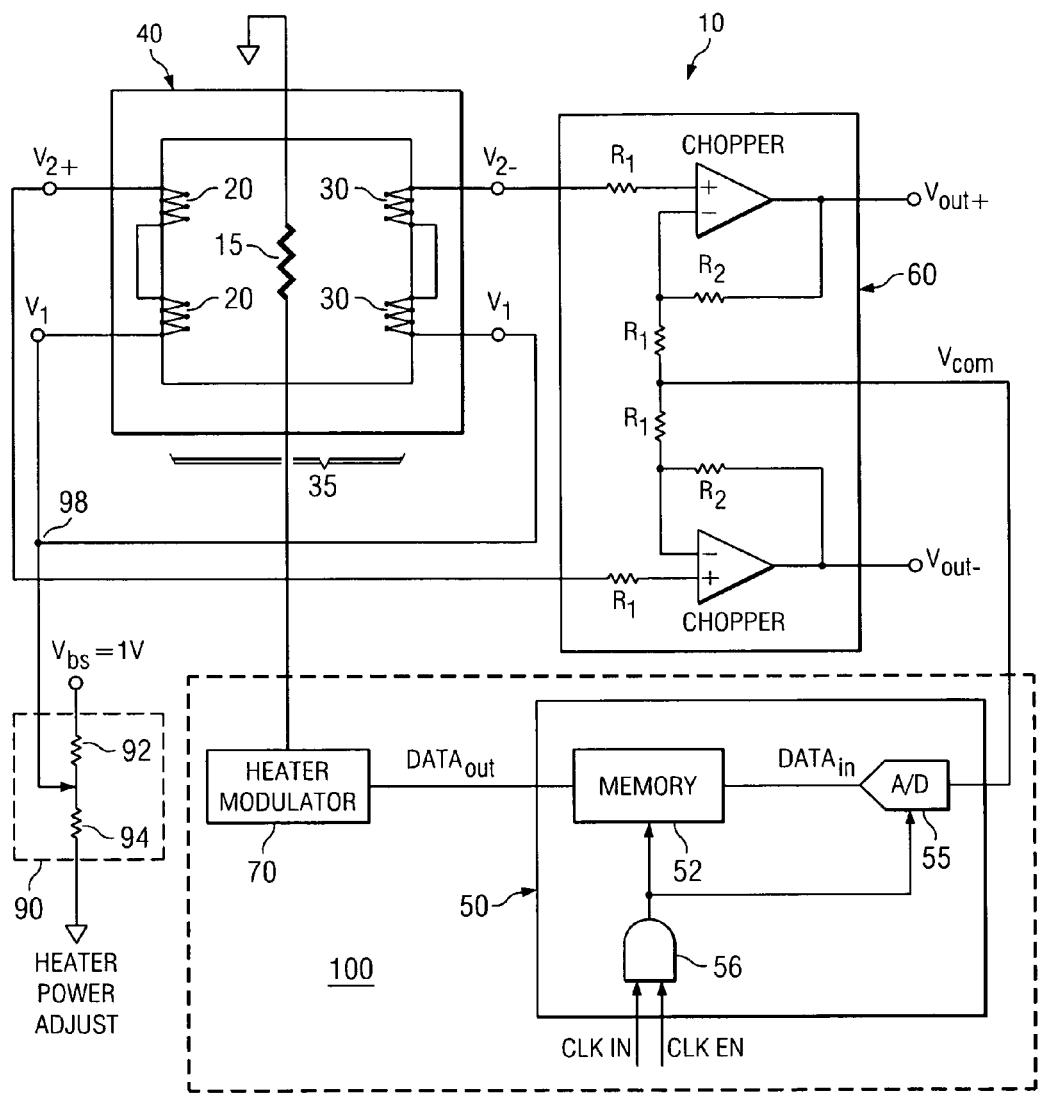
FIG. 5 is a schematic drawing of a second illustrative closed-loop heater control circuit for a thermal sensing device in accordance with the present invention.

Another means of opening the heater control circuit loop at the beginning of every new cycle includes replacing the error amplifier 80 with a digital circuit 50 as shown in FIG. 5. The digital circuit 50 includes an analog-to-digital (A/D) converter 55, which converts the analog common-mode voltage, $V_{com}$, signal to a digital signal, $DATA_{in}$. These data are delivered to the controller or modulator 70 and are also stored in memory 52. The controller or modulator 70 is adapted to adjust the heater power to the heater element 15 according to these data.

A system clock CLK_IN is electrically coupled to one terminal of a logic AND circuit 56 and a clock enable signal CLK_EN is electrically coupled to the other terminal of the logic AND circuit 56. During power-down and initial start-up phases, the clock enable signal CLK_EN is kept at a logic LO. As a result, output from the memory 52 is not updated. After the predetermined period of time, and for the remainder of the cycle, the clock enable signal CLK_EN is kept at a logic HI and, correspondingly, output from the memory 52 is continuously updated.

Another means of improving start-up time during power cycling is to maintain the power on the heater element 15 uninterrupted. By supplying power to the heater element 15 and to the power-cycling signal processing circuit continuously, start-up time will be greatly improved because the signal processing circuit can have a very fast start-up time compared to the time it takes the heater element 15 temperature to stabilize.

Figure 6:
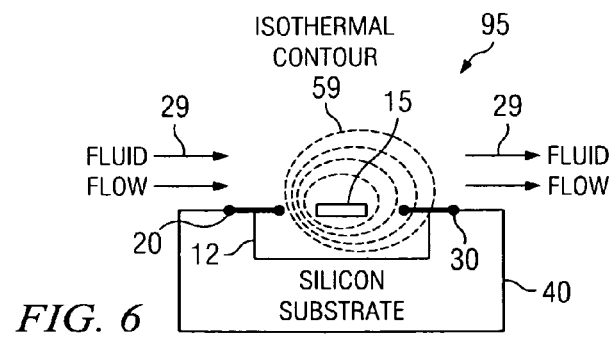
FIG. 6 is an elevation view of a thermal flow sensing device in accordance with the present invention.

A thermal flow sensing device 95 is shown in FIG. 6. The thermal flow sensing device 95 differs from the thermal accelerometers in that the thermal flow sensing device 95 is not hermetically sealed. Hence, thermal distribution (shown in the figure as isothermal contours 59) is subject to disturbance by external fluid flow 29. For the exemplary illustration shown in FIG. 6, with fluid 29 flowing from left to right, the thermocouple 30 on the right side will experience a temperature increase while the thermocouple 20 of the left side will experience a temperature decrease. Accordingly, for non-hermetically sealed sensing device 95, the heater power control circuit 100 must be adapted to account for these thermal imbalances.

Those of ordinary skill in the art will appreciate that variations to and modification of the above-described silicon micro-machined convective accelerometer device may be made without departing from the inventive concepts disclosed herein. Accordingly, the invention should not be viewed as limited except as by the scope and spirit of the appended Claims.

What is claimed is:

1. An integrated convective accelerometer comprising:
a convective acceleration sensor including a heater element and a plurality of temperature sensing elements, the plurality of temperature sensing elements being operative to generate a differential output voltage indicative of a magnitude of acceleration applied along at least one axis passing through the heater element and the plurality of temperature sensing elements;
amplification circuitry configured to receive the differential output voltage generated by the plurality of temperature sensing elements and operative to generate a corresponding common-mode output voltage;
control circuitry configured to receive the common-mode output voltage generated by the amplification circuitry and operative to generate a control output proportional thereto, the control circuitry being further operative to regulate the common-mode output voltage using the control output; and
an enabling clock signal device that is electrically coupled to turn off the control circuitry for a predetermined period of time of every new cycle.

2. The accelerometer as recited in claim 1, wherein the control circuitry is operative to regulate the common-mode output voltage by regulating a current through the heater element.

3. The accelerometer as recited in claim 2, wherein the control output is a pulsed output and the control circuitry is operative to regulate the current through the heater element using at least one of pulse-density modulation and pulse-width modulation.

4. The accelerometer as recited in claim 3, wherein the control circuitry includes a sigma-delta modulator operative to generate the pulsed output.

5. The accelerometer as recited in claim 1, wherein the enabling clock signal device is adapted to provide a logic LO (0) clock signal for a predetermined period of time of every new cycle after the integrated convective accelerometer is turned ON and a logic HI (1) enabling clock signal thereafter and until a subsequent new cycle.

6. The accelerometer as recited in claim 5, wherein the predetermined period of time corresponds to an amount of time required for the accelerometer to reach a stable temperature state.

7. A method of operating a convective acceleration sensor, the acceleration sensor including a heater element and a plurality of temperature sensing elements, the method comprising the steps of:
first generating a differential output voltage indicative of a magnitude of acceleration applied along at least one axis passing through the heater element and the plurality of temperature sensing elements;
second generating a common-mode output voltage corresponding to the differential output voltage;
third generating a control output proportional to the common-mode output voltage;
regulating the common-mode output voltage using control circuitry and the control output; and
enabling a clock signal device that is electrically coupled to turn off the control circuitry for a predetermined period of time of every new cycle.

8. The method of claim 7 wherein the regulating step includes the substep of regulating a current through the heater element.

9. The method of claim 8 wherein the control output generated in the third generating step is a pulsed output, and the regulating step includes the substep of regulating the current through the heater element using pulse modulation.

10. The method of claim 9 wherein the pulse modulation used in the regulating step is at least one of pulse-density modulation and pulse-width modulation.

11. The method of claim 8 wherein the second generating step includes the substep of setting the common-mode output voltage to a desired level.

12. The method of claim 7 wherein the common-mode output voltage is proportional to power dissipated in the heater element of the convective acceleration sensor.

13. A heater control circuit for use with an integrated circuit thermal sensing device, the thermal sensing device having a thermopile/heater assembly, including a heater element and an array of thermocouples disposed on opposing sides of the heater element, that is disposed in a cavity that has been micro-machined or etched into a substrate, and an instrumentation amplifying device that is electrically coupled to the thermopile/heater assembly and that is adapted to extract a common-mode voltage signal based on received signals from the array of thermocouples, the heater control circuit comprising:
an integrating circuit having a plurality of switches to compare the common-mode voltage signal from the instrumentation amplifying device to an analog common reference voltage, wherein the integrating circuit includes an enabling device that is adapted for controlling an operating status of each of the plurality of switching devices and wherein the operating status of each of the plurality of switching devices is controlled by the enabling device so that after the integrated circuit thermal sensing device has been turned ON, the heater control circuit remains open for a predetermined amount of time during each new cycle, after which said heater control circuit is close-looped; and
a controller or modulator that regulates current through the heater element using pulse modulation.

14. The heater control circuit as recited in claim 13, wherein the integrating circuit is a switched-capacitor integrating circuit.

15. The heater control circuit as recited in claim 14, wherein the switched-capacitor integrating circuit includes:
a switched input capacitive device, the switched input capacitive device having an input capacitive device and a plurality of switching devices;
an integrating operational amplifier for comparing the common-mode voltage signal to the analog common reference voltage;
an integrating capacitive device for providing feedback to the integrating operational amplifier.

16. The heater control circuit as recited in claim 14, wherein the controller or modulator is a sigma-delta modulator.

17. The heater control circuit as recited in claim 14, wherein pulse modulation includes at least one of pulse-width modulation and pulse-density modulation.

18. A heater control circuit for use with an integrated circuit thermal sensing device, the thermal sensing device having a thermopile/heater assembly, including a heater element and an array of thermocouples disposed on opposing sides of the heater element, that is disposed in a cavity that has been micro-machined or etched into a substrate, and an instrumentation amplifying device that is electrically coupled to the thermopile/heater assembly and that is adapted to extract a common-mode voltage signal based on received signals from the array of thermocouples, the heater control circuit comprising:

an analog-to-digital converter for converting the common-mode voltage to digital signals;
a memory device for storing the digital signals;
logic circuitry that is adapted to not update stored digital signals until after a predetermined period of time of each new cycle, wherein the logic circuitry includes a logic AND circuit to which a system clock is electrically coupled to a first terminal and a clock enable signal is electrically coupled to a second terminal thereof; and a controller or modulator that regulates current through the heater element using stored digital signals.

19. The heater controller as recited in claim 18, wherein the clock enable signal is maintained at a logic LO (0) during the predetermined period of time of every new cycle, after which the clock enable signal is maintained at a logic HI (1) until a subsequent new cycle.

* * * * *